Oct. 14, 1958     A. H. DEWEES     2,856,202
SAFETY BELT DEVICE FOR AUTOMOBILES
Filed Aug. 24, 1955     2 Sheets-Sheet 1

INVENTOR.
ALEXANDER H. DEWEES
BY
Barnes, Kisselle, Laughlin & Raisch
ATTORNEYS.

Oct. 14, 1958 — A. H. DEWEES — 2,856,202
SAFETY BELT DEVICE FOR AUTOMOBILES
Filed Aug. 24, 1955 — 2 Sheets-Sheet 2
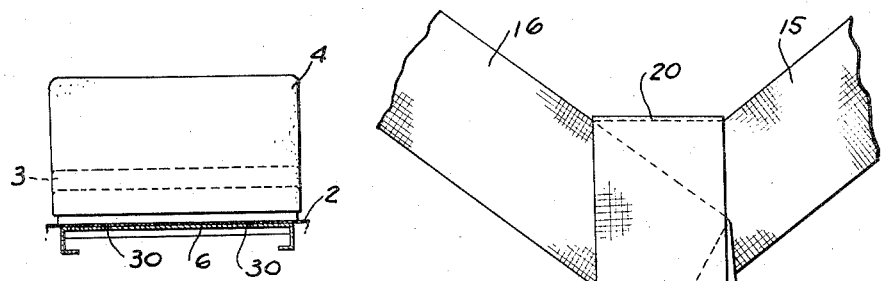
Fig. 5
Fig. 6
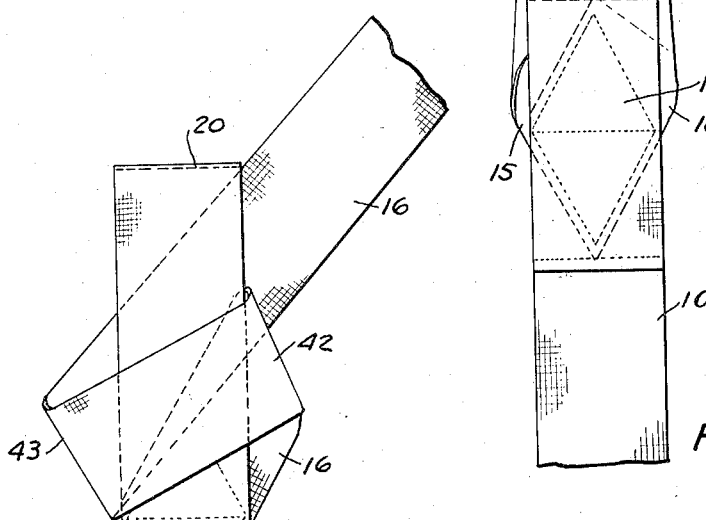
Fig. 7
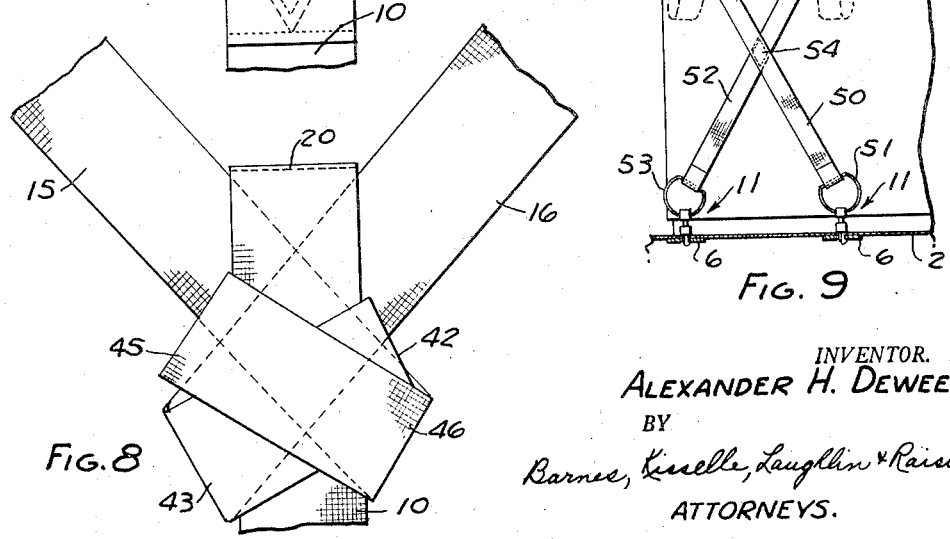
Fig. 8
Fig. 9
INVENTOR.
ALEXANDER H. DEWEES
BY
Barnes, Kisselle, Laughlin & Raisch
ATTORNEYS.

United States Patent Office 2,856,202
Patented Oct. 14, 1958

2,856,202

SAFETY BELT DEVICE FOR AUTOMOBILES

Alexander H. Dewees, Detroit, Mich.

Application August 24, 1955, Serial No. 530,237

5 Claims. (Cl. 280—150)

This invention relates to a safety device for automobiles.

It often occurs that when an automobile is involved in an accident and comes abruptly to a stop or is abruptly decelerated, that the occupant or occupants are thrown or impelled forwardly relative to the vehicle. Possibly the occupant or occupants are not actually thrown forward as it may be their own inertia which causes the movement. There are times perhaps when the body or torso of the occupant or occupants abruptly moves forward relative to the automobile by flexing or bending at the hips, so that even if an occupant strongly supports himself with his legs the inertia of the weight of his body causes the forward movement with the result that the head or face may strike the windshield or some other front portion of the vehicle, such as the instrument panel or the like, with resultant damage.

It has been proposed to equip vehicles with a form of safety belt similar to those used in airplanes, which is fastened over the occupant of the seat at about the level of the hips. There is some objection to this kind of safety belt insofar as it is used in an automobile. It results in a feeling of confinement and interferes with normal movements. Such a belt usually employes a form of buckle which requires two hands to release. Furthermore, such a belt is positioned so low on the passenger that it does not restrain forward movement of the upper part of the body. Furthermore, safety belts of this kind require special construction in the vehicle to which the belt is to be applied.

This invention aims to provide a safety device which will restrain forward movement of the body of a passenger by engaging the passenger in the proximity of the shoulders. Thus, the passenger is restrained against being impelled forwardly more effectively in that the body is restrained at a higher elevation and prevents or substantially prevents forward motion by bending at the hips. It is also an object of the invention to provide a safety device so arranged that the user thereof may easily slip into and out of the device without employment of buckles or the like, and which normally does not create the feeling of confinement or restraint to the extent of a safety belt applied across the hip line. A still further object is to provide a safety device which may be adjusted as to length without the use of fasteners, buckles or mechanical shortening or lengthening devices. A still further and important object is the provision of a safety device which requires at least a minimum and in some instances practically no additional structure in the vehicle to which the safety device may be secured.

A safety device constructed in accordance with the invention is shown in the accompanying drawings:

Fig. 5 is a view of the back of a seat of an automobile illustrating, somewhat diagrammatically in section, certain structural features of the automobile.

Fig. 6 is a view illustrating how the device may be shortened in order to adapt it to the size of the occupant using the same.

Fig. 7 is a view with some parts shown in dotted lines illustrating a further shortening, and showing only one element for clarity.

Fig. 8 is a view similar to Fig. 7 showing how the device is shortened.

Fig. 9 is a view illustrating a modified form of the invention.

Figure 1:
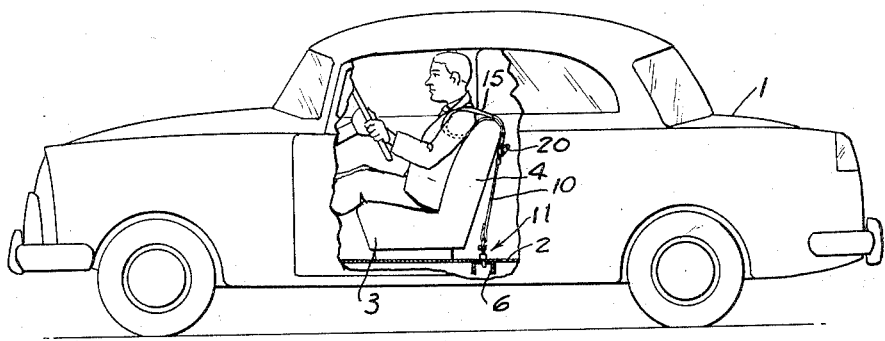
Fig. 1 is a view illustrating a passenger automobile with the safety device of this invention applied thereto and in use by a passenger.

The invention is applicable to various kinds of automotive vehicles including passenger cars, industrial vehicles and trucks and other vehicles, and a passenger car is shown at 1 in Fig. 1 with a floor 2 and a seat therein having a seat portion 3 and a seat back 4. The occupant is illustrated as being the driver. There is also shown a structural element 6 under the floor 2. This element may be a part of the chassis of the vehicle. On the other hand, this element may be a bracket or plate mounted to the chassis of the automobile for the specific purpose of attachment for the safety device.

Figure 2:
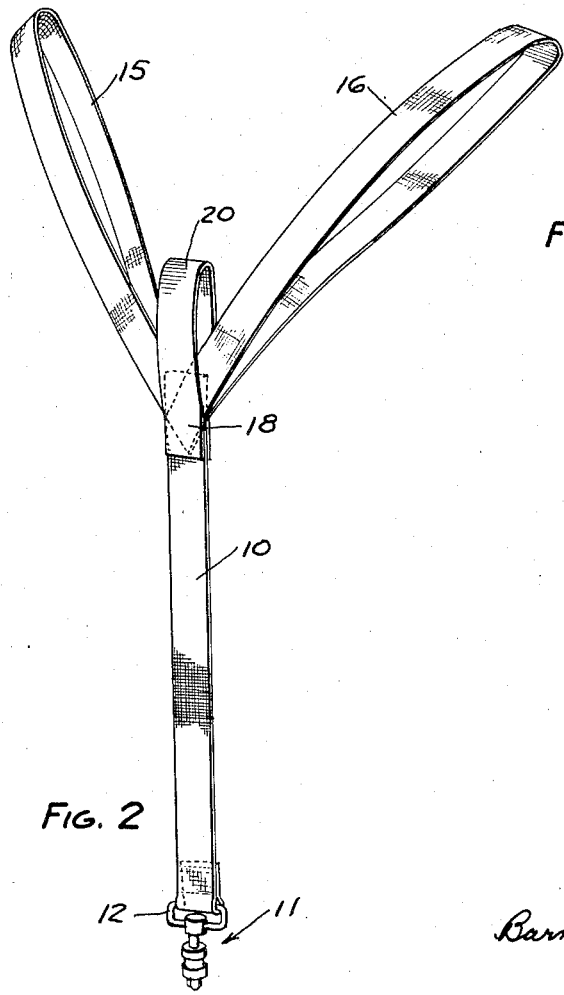
Fig. 2 is a general view of perspective nature illustrating a safety device.

The safety device as illustrated in Fig. 2 resides in a length of material 10 in the nature of a strap. It may be made of any suitable material, such as a woven fabric, leather, a plastic material or the like, and it has attached thereto at its lower end a fastener generally illustrated at 11. For this purpose the fastener may have a loop 12 to which the end of the strap 10 is secured in any suitable manner.

At the upper end of the strap 10 are two loops 15 and 16. These loops are, like the strap 10, made of any suitable material such as a woven fabric, leather, plastic or the like. Each loop may consist of a length of such material folded upon itself to provide the loop formation with the ends thereof overlapped relative to each other and relative to the strap 10 and stitched or otherwise secured to the strap 10 as at 18. The loops 15 and 16 extend angularly from the strap 10. Beyond the intersection 18 where the several layers are stitched or secured together is a loop of material 20. This loop may be provided by the extending end of the strap 10 folded back upon itself and secured or stitched at the junction 18. On the other hand, the loop 10 may be of a separate piece of material stitched or otherwise secured to the remaining structure at about the junction 18. The loop 20 may be of any suitable material such as the same material of which the strap and the loops are made.

Figure 3:
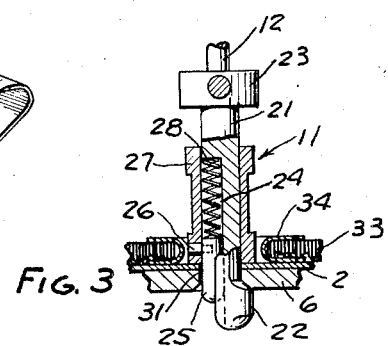
Fig. 3 is a detailed view partly in section illustrating a preferred type of fastener.
Figure 4:
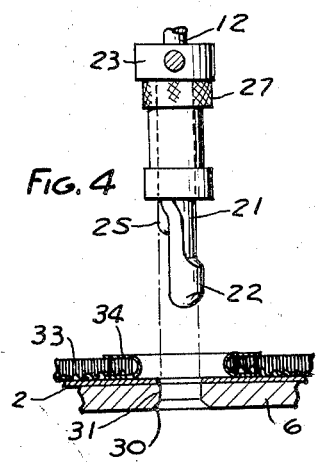
Fig. 4 is a view similar to Fig. 3 illustrating the fastener in unlatched position.

The preferred type of fastener is shown in Figs. 3 and 4. The body 21 of the fastener has a head 22 which in reality may be considered a half head, and a terminal piece 23 to which the loop 12 is attached. Opposite the head, the body 21 is provided with a groove 24 for slidably receiving a plunger 25. This plunger is secured, as by means of a pin 26, to an actuating sleeve 27 slidably mounted on the body 21. A spring 28 urges the plunger normally downward and since the plunger is secured to the actuator sleeve 27 the spring urges the sleeve 27 downwardly. The limit of the downward urging is reached when the lower end of the sleeve 27 abuts the head 22. In Fig. 3 the fastener is shown applied to the structural element 6. For this purpose the structural element 6 is merely provided with an aperture 30 and, of course, in order to have access to the aperture, the floor panel 2 is provided with an aperture 31. The carpet or floor covering 33 is provided with an aperture which may be defined by a grommet 34.

The fastener may be secured to the element 6 by retracting the sleeve 27 against the action of the spring to a position as indicated in Fig. 4. The limit of this retracting movement may be when the sleeve strikes the piece 23. The cross dimensions of the head 22 are now such that it may be passed through the aperture 6. Then the sleeve is released and the spring projects the plunger 25 into the aperture as shown in Fig. 3. The combined cross dimensions of the body 21 and the plunger 25 are preferably such as to substantially snugly fill the aperture 30 but the head 22 lies under the structural element 6 so that the fastener cannot be pulled out.

With a structure of this kind the manufacture of the vehicle need only provide a sufficiently strong structural element to which the fastener of a safety device may be secured. As aforesaid the aperture 30 may be provided in an already existing structural element of the chassis or frame of the vehicle, but if no structural element of the frame or element of the chassis, which is strong enough for the purpose, is properly located to be thus apertured, or if it be the desire of the manufacturer, a separate plate may be located and secured to the vehicle structure for this purpose.

In use, the structure appears as shown in Fig. 1. The safety device is applied in a manner very similar to putting on a pair of suspenders, so to speak. The occupant passes one arm through one loop and passes his other arm through the other loop, and the loops, when properly positioned, extend around the shoulders of the occupant engaging the occupant at substantially the arm pits. Normally, the safety device is not applied in a tight fashion. Sufficient looseness is preferred so that normal movements of the occupant are not restrained or otherwise interfered with. Similarly, if a person wishes to remove the device, first one arm and then the other may be slipped out through the loops and this is easily done without the use of hands to manipulate a buckle or the like. This is an important factor following an accident when perhaps it is not feasible to use the hands for manipulating a buckle or other fastener.

The point of attachment to the structural element is preferably in proximity to the floor at lower end of the seat back 4. Usually a seat is inclined rearwardly as shown in Fig. 1, and element 6 is preferably located so that the point of connection of the fastener 11 is forward of a vertical line extending downwardly from the upper rear edge of the seat back. Thus the strap 10 inclines upwardly and rearwardly.

When an impact occurs, the passenger is strongly and effectively held against being thrown or impelled forwardly. The passenger is effectively held against that action of the upper part of the torso being thrown or projected forwardly by bending at the hip line. Moreover, the structure of the seat back does not perform the function of holding the occupant. The seat back 4 serves as a strut, more or less, and is placed under compression as the safety device is tensioned. It has been found that this arrangement holds a passenger against being thrown or impelled forwardly even in those types of automobile bodies which have only two doors, wherein the back of the front seat is pivoted so as to swing forwardly to facilitate entrance of passengers to the rear seat. This appears to be due to conflicting arcs of movement which places a tension on the safety device and not only holds the back of the seat from pivoting forward but likewise holds the occupant from forward movement.

The device is shown as applied to the front seat of a vehicle. This is perhaps the location where the most damage occurs incident to accidents. However, the device may be applied to the back seat of a passenger vehicle or to any one of the several seats in a vehicle such as a station wagon or the like.

When the device is extended to its full length it appears as shown in Fig. 2. To shorten the device the loops 15 and 16 may be crossed over relative to each other as shown in Fig. 6. The loop 16 is folded upon itself at fold line 40 so that it extends angularly to the left as Fig. 6 is viewed, and the loop 16 is passed through the loop 20. The loop 15 is folded upon itself as at 41, passed through loop 20 so that it extends angularly upwardly from the strap 10 as indicated in Fig. 6. With the material of the loops approximately two inches in width and made of woven fabric this cross folding of the loops 15 and 16 results in shortening the device about two and one-half inches. The folds are not drawn tight in Fig. 6 for clarity.

When the strap is shortened as shown either in Fig. 6 or Figs. 7 and 8 the pulling forces or tension in the strap is not taken by the loop 20. The loop 20 merely serves to prevent a twisting action which would tend to straighten out the folds in the material. When the folds are drawn taut and compact, the parts remain compactly in such position and the strap 10 is held from twisting so that the shortening remains effective.

The overall length of the device may be further shortened by a double crossing of the loops as indicated in Fig. 7. In Fig. 7 the loop 16 only has been shown in order to make the manner of folding clear, and furthermore the folds have not been pulled tight. The loop 16 is folded back upon itself as at 42 and it crosses the width of the strap 10 and then it is folded again on itself as at 43 and passed through the loop 20. Thus the material of the loop 15 traverses the width of the strap 10, so to speak, resulting in double shortening of about five inches where the material is of woven fabric about two inches wide. Both loops 15 and 16 are shown in double shortened position in Fig. 8, this view being quite diagrammatic and the folds are not drawn tight. The loop 16 is folded back upon itself as at 42, folded again on itself as at 43, passed through the loop 20 so as to extend angularly upwardly to the right as Fig. 8 is viewed. Loop 15 is folded back upon itself as at 45, again folded back upon itself as at 46, passed through the loop 20 and it extends upwardly and to the left as Fig. 8 is viewed.

Thus it will be seen that the safety device is readily adjustable as to length without the use of adjusting buckles or other equipment. The purpose of having it adjustable as to length is to accommodate occupants of different sizes. A short person may require a different length than a tall person and, furthermore, the height of the seat back is a factor and this may vary in different automobiles. Also, one occupant may prefer a rather loose fit and another occupant may prefer a snug fit.

A modified form of the invention is shown in Fig. 9 where, instead of using a single strap, two straps are employed. The floor of the car is illustrated by the same reference character 2, the bracket or structural element as at 6 and the attaching devices at 11. In this case two structural element attaching devices are used as shown. One strap 50 is connected to one attaching device by a loop 51, the other strap 52 is connected by a loop 53 to the other attaching device. The straps preferably cross each other where they may be secured at 54 and each has on its end a loop as indicated at 55 and at 56.

Tests have shown that the safety device of this invention, when properly applied and adjusted, does not materially interfere with or restrict normal movements of an occupant as the occupant sits in a traveling vehicle. It has the attribute of not causing the occupant to feel restrained. Indeed, the device is useful for normal vehicle operation and creates a desirable sensation in that it supports and holds the occupant when the brakes are applied hard for a quick stop as so often occurs in heavy traffic.

A feature of the invention is that the safety device is easily and quickly mounted for use and may be easily detached when use is not desired. The owner of the car or other user, when not desiring to use the device, may detach it and fold it and put it in the glove compartment of the vehicle or store it in some other place. As a result, there are no elements of the safety device or structural elements built into the car which offer any interference of the normal use of the car or to its interior appearance. Thus the safety device is not a permanent part of the vehicle structure. The safety device is obtainable and usable at the option of the occupant or owner of the car and the only structural feature built into the car is the apertured supporting bracket or plate.

I claim:

1. A safety device for an occupant of an automotive vehicle, the vehicle having a floor, a seat and a seat back for the occupant comprising, a strap member, a fastener on the strap member adapted to be secured to a structural element of the vehicle substantially at the level of the floor and to the rear of the seat, said strap means adapted to extend upwardly at the rear of the seat back, a pair of closed loops secured to and extending angularly substantially from the upper end of the strap means and adapted to pass over the top of the seat back and extend to the forward side thereof, said loops being applicable to an occupant so that each extends around an arm or shoulder of the occupant substantially at the arm pit, said strap means including another relatively small loop positioned in the angle between the first two loops, each of the first two loops being foldable upon itself to traverse the strap means and being insertable through the relatively small loop, to thereby shorten the overall length of the safety device, said relatively small loop serving to resist twisting action when the strap means and said two loops are under tension.

2. A safety device for an occupant of an automotive vehicle, the vehicle having a floor, a seat and a seat back for the occupant comprising, a strap member, a fastener on the strap member adapted to be secured to a structural element of the vehicle substantially at the level of the floor and to the rear of the seat, said strap means adapted to extend upwardly at the rear of the seat back, a pair of closed loops secured to and extending angularly substantially from the upper end of the strap means and adapted to pass over the top of the seat back and extend to the forward side thereof, said loops being applicable to an occupant so that each extends around an arm or shoulder of the occupant substantially at the arm pit, another relatively small loop positioned in the angle provided by the first two loops, said small loop being secured to the strap means, the said two loops each being foldable twice upon itself and then adapted to be extended through the relatively small loop thus shortening the overall length of the device, said relatively small loop serving to resist twisting of the strap means when the strap means and said two loops are under tension.

3. A safety device for an occupant of an automotive vehicle, the vehicle having a floor, a seat and a seat back for the occupant comprising, a strap member, a fastener on the strap member adapted to be secured to a structural element of the vehicle substantially at the level of the floor and to the rear of the seat, said strap means adapted to extend upwardly at the rear of the seat back, a pair of closed loops secured to and extending angularly substantially from the upper end of the strap means and adapted to pass over the top of the seat back and extend to the forward side thereof, said loops being applicable to an occupant so that each extends around an arm or shoulder of the occupant substantially at the arm pit, another relatively small loop positioned in the angle between the first two loops, the strap means and the said pair of loops being made of flexible relatively wide flat material, said pair of loops each being foldable upon itself to traverse the strap means and being insertable through the relatively small loop, to thereby shorten the overall length of the safety device, said relatively small loop serving to resist twisting action when the strap means and the said pair of loops are under tension.

4. A safety device for an occupant of an automotive vehicle, the vehicle having a floor, a seat and a seat back for the occupant comprising, a strap means, fastener means on said strap means adapted to be secured to a structural element of the vehicle substantially at the level of the floor and to the rear of the seat, said strap means adapted to extend upwardly at the rear of the seat back, said strap means including spaced closed loops, said loops being adapted to pass over the top of the seat back and extend to the forward side thereof, said loops being applicable to an occupant so that each extends around an arm or shoulder of the occupant substantially at the arm pit, means forming a relatively small loop positioned between the first mentioned loops, each of the first mentioned loops being foldable transversely and being insertable through the relatively small loop to thereby shorten the overall length of the safety device, said relatively small loop serving to resist twisting of the strap means when the strap means and the first mentioned two loops are under tension.

5. A safety device for an occupant of an automotive vehicle comprising, strap means having means adapted to be fastened to a portion of an automotive vehicle and having means forming generally at one end a pair of shoulder loops, said strap means having an overall length such that when said fastening means is secured to a vehicle, said loops can be extended forwardly of the upright portion of a seat for application to a seat occupant, means forming another loop adjacent said shoulder loops, said shoulder loops being foldable around and insertable through said other loop to thereby shorten the overall length of said safety device, said other loop serving to resist twisting of said strap means when said strap means is under tension.

References Cited in the file of this patent

UNITED STATES PATENTS

| | | |
|---|---|---|
| 894,052 | Radtke | July 21, 1908 |
| 1,050,874 | Twombly | Jan. 21, 1913 |
| 1,298,615 | Wilkinson | Mar. 25, 1919 |
| 2,365,625 | Carlisle | Dec. 19, 1944 |
| 2,464,543 | Modrey | Mar. 15, 1949 |
| 2,622,664 | Koehler et al. | Dec. 23, 1952 |
| 2,710,649 | Griswold et al. | June 14, 1955 |
| 2,758,769 | Nunn et al. | Aug. 14, 1956 |
| 2,771,128 | Doolittle | Nov. 20, 1956 |